Dec. 20, 1960  C. W. LEMMERMAN  2,965,190
JET ENGINE MUFFLER

Filed July 2, 1958  2 Sheets-Sheet 1

INVENTOR
CARL W. LEMMERMAN

BY *Lindsey and Prutzman*
ATTORNEYS

Dec. 20, 1960     C. W. LEMMERMAN     2,965,190
JET ENGINE MUFFLER

Filed July 2, 1958     2 Sheets-Sheet 2

INVENTOR
*CARL W. LEMMERMAN*

BY *Lindsey and Prutzman*
ATTORNEYS es Patent Office 2,965,190
Patented Dec. 20, 1960

2,965,190

JET ENGINE MUFFLER

Carl W. Lemmerman, West Hartford, Conn., assignor to C. W. Lemmerman, Inc., Hartford, Conn., a corporation of Connecticut Filed July 2, 1958, Ser. No. 746,268

14 Claims. (Cl. 181—35)

This invention relates to improvements in gas turbine exhaust mufflers, and more particularly to apparatus for frequency detuning of objectionable sound.

A major object is to provide an effective sound frequency detuner particularly adapted for incorporation in the tail pipe extension section of an aircraft gas turbine of the type commonly termed a "jet engine" to attenuate objectionable exhaust sounds within the audible range, and particularly the sound accompanying low frequency turbulence.

A further object is harmonically to detune particularly objectionable gas turbine exhaust sounds by conversion of the frequencies thereof to higher complex frequency patterns which are acoustically more acceptable to the human ear.

A still further object is effectively to reduce the energy level of gas turbine exhaust sounds through elimination of a portion of that energy as a nuisance to humans by conversion to frequency ranges beyond the human ear.

A still further object is to eliminate certain objectionable gas turbine exhaust frequencies by harmonic heterodyning with resultant energy neutralization through opposed phase cancelation.

Other objects will be in part obvious and in part pointed out more in detail hereinafter.

As will be apparent to persons skilled in the art, various modifications and adaptations of the structure above described will become readily apparent without departure from the spirit and scope of the invention, the scope of which is defined in the appended claims.

Figure 1:
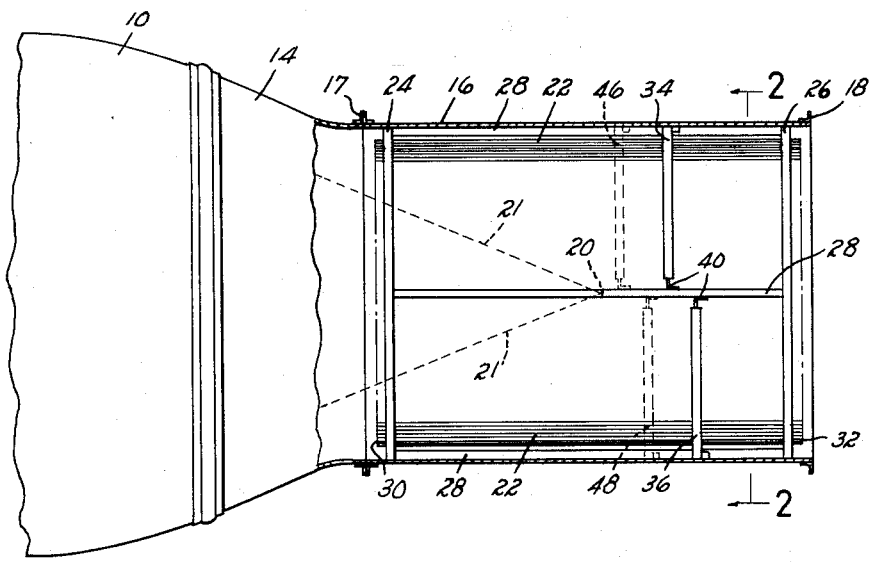
Fig. 1 is an elevational view of the tail section of an aircraft gas turbine, with the housing partially broken away to disclose a frequency detuner in accordance with the invention.

The device of the drawings, and hereinafter described in detail, incorporates well founded principles of sound frequency detuning by harmonic conversion to a plurality of higher frequencies which are heterodyned to provide resulting cancelation of like frequencies of opposed phase. Sound waves, which are always longitudinal waves initiated in an elastic conveying medium by a vibratory source, may be attenuated by dissipation of the energy thereof by conversion to mechanical energy (viscous forces) or to heat energy; rendered less objectionable by frequency conversion, and eliminated in part by cancelation.

As is known, two trains of sound waves may under certain conditions, be caused to neutralize each other's effects and produce silence where previously there was a definite sound due to either of the trains of waves. This principle of sound elimination is employed in the present invention by providing an annular array of metal rods or wires about the terminal portion of the exhaust cone of a gas turbine in the area of maximum low frequency turbulence, with the rods mounted to be transversely vibrated by the exhaust gases. Arc-like frets engage the rods intermediate the ends thereof and extend through portions of the circumference of the array. The frets are so positioned as to fix the frequency of rod portions in one of the fret defined areas as a multiple of the frequency of portions of the rods in another of such areas. This results in the production of harmonic frequencies and overtones or upper partials which are an integral multiple of the vibration rate producing the fundamental, meaning the sounds which place the rods in vibration, some of which are eliminated by cancelation, and others removed beyond the audible range.

It is known that if two vibrations of the same amplitude of nearly equal frequencies act together, the resulting amplitude will first be double the single amplitude and as the high frequency vibration gains on the lower, thereby changing the relative phase, a point will be reached where they are in phase and will neutralize each other. While the present invention is not to be limited in any manner by a theory of operation, it is believed that by providing multiple rod sections divided by frets in one or more of the sections which are adjusted in a manner to produce the above mentioned harmonic frequency resulting from the location of the fret in the other rod section, the two resultant harmonic frequencies operate ultimately to at least partially neutralize each other. This is not a permanent condition however and results in beats as the cycle is repeated. By proper selection of the frequencies by selected setting of the frets, the resulting beat frequency obtained is far less objectionable acoustically, to the human ear, than are the gas initiated frequencies which are employed to produce that beat frequency. In addition, a portion of the sound energy from the exhaust cone is dissipated as mechanical and heat energy, while a portion is eliminated by opposed phase cancelation.

As shown in Fig. 1, the rear housing 10 of an aircraft gas turbine leads into a tapering tailpipe 14 which in turn leads into a cylindrical housing 16 forming a tailpipe extension and connected thereto by a flanged coupling 17. The free end of cylinder 16 carries a flange 18 for attachment of a diffuser or the like with which the present invention is not concerned. The sound detuner incorporating the invention is completely housed within cylinder 16 in which the cone of the exhaust from tailpipe 14 terminates in an apex at about the position 20, as shown by the dotted lines 21. The cone area most productive of low frequency turbulence may extend from near the plane of connecting flange 17 to the apex 20 of the cone, and it is this low frequency turbulence as well as frequencies resulting from the passage of the exhaust gases through the relatively large tailpipe which produce the most objectionable sound, and which the invention reduces by detuning.

Figure 2:
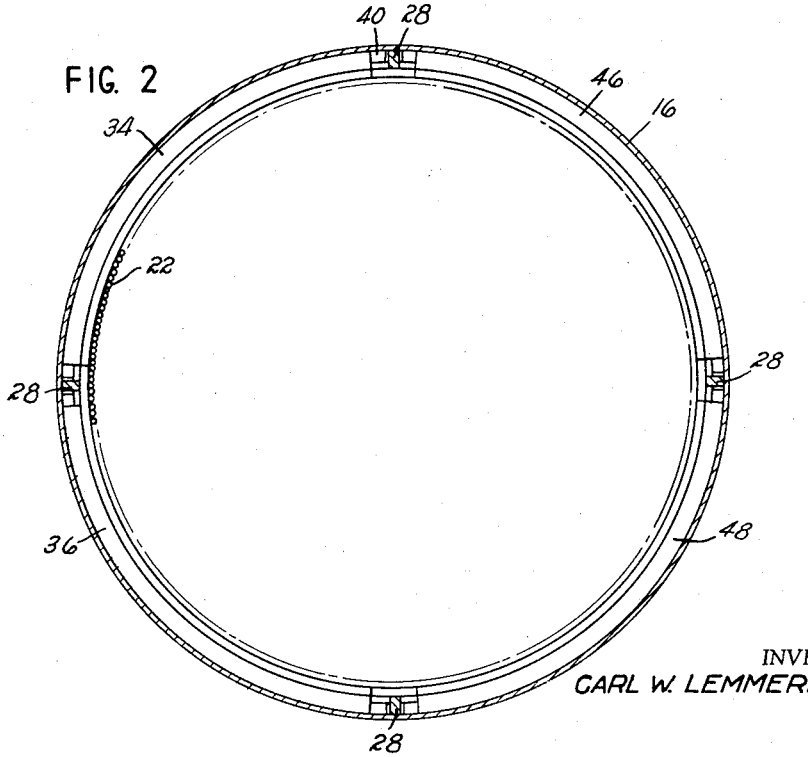
Fig. 2 is a vertical section along line 2—2 of Fig. 1.

The construction of the annular detuner housed in the tailpipe extension cylinder 16 is such that it offers minimum back pressure in respect to the exhaust gases, and since those gases are initially dispelled in a conical configuration from which they expand to fill the cylinder, the detuner does not actually increase the back pressure to any appreciable extent. The detuner structure, as shown in Figs. 1 and 2, includes a plurality of rod or wire-like elements 22, hereinafter termed rods, held under tension in annular configuration between a pair of ring-like supporting members 24 and 26 mounted in parallel axially spaced relation adjacent the opposite ends of cylinder 16 as by welding to the inner wall of the cylinder. A plurality of longitudinal struts or braces 28 are positioned in parallel circumferentially spaced relation between the annular supporting members 24 and 26, four such braces being shown disposed in 90° angularity and welded to the inner wall of cylinder 16, thus defining quadrants with the rods isolated into four groups. Rods 22 are welded at points spaced inwardly from the ends thereof to the apex 29 of a V-shaped inner ridge of members 24 and 26, the weld being shown at 31, to complete a cage-like annular framework which is capable of supporting the rods 22 stretched axially under suitable tension.

While the invention is not limited to the employment of any particular size of rod 22, or to the rod material, it has been found that stainless steel rods which vary in size from the piano wire range to larger are quite satisfactory. The rods are mounted to the cage by first being welded to the inner apex of one of the annular supporting members such as 24 with the ends thereof extending somewhat beyond that member as shown at 30, and then held under tension and similarly welded to the inner surface of the opposite supporting member 26 with the rod ends extending therebeyond in a like manner as shown at 32 for a purpose later described. As shown in the drawings, the rods may be in substantial abutment with little or no space therebetween, and while the detuner has been found to operate satisfactorily regardless of the spacing therebetween, it is preferable that the rods be slightly spaced apart to promote the transverse vibrations which are necessary for proper operation of the device.

As stated, the annular rod array above described is divided into quadrants by longitudinal strengthening braces 28 between which tuner frets extend as later described. While such a structure has been found effective and economical to produce, the efficiency of the detuner is somewhat enhanced by a further division of the circumference thereof into more than four isolated sections, as, for example, by providing eight instead of four longitudinal braces, the reasons for the increased efficiency being later described.

Figure 3:
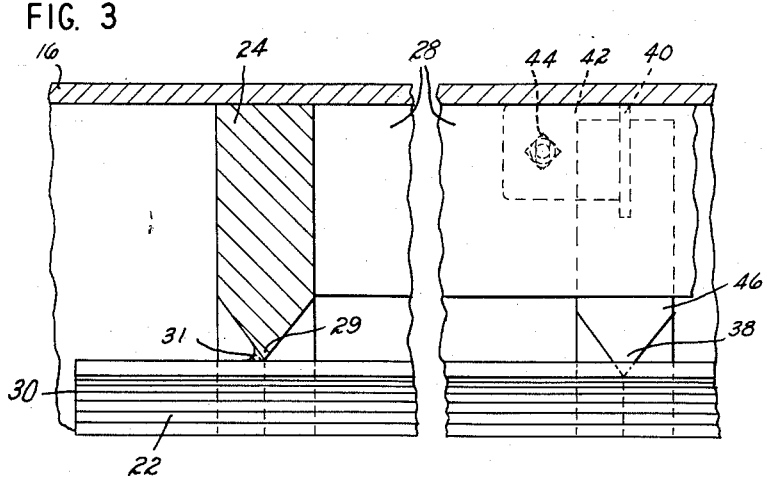
Fig. 3 is an enlarged partial and broken diametric upper section of the device of Fig. 1.
Figure 4:
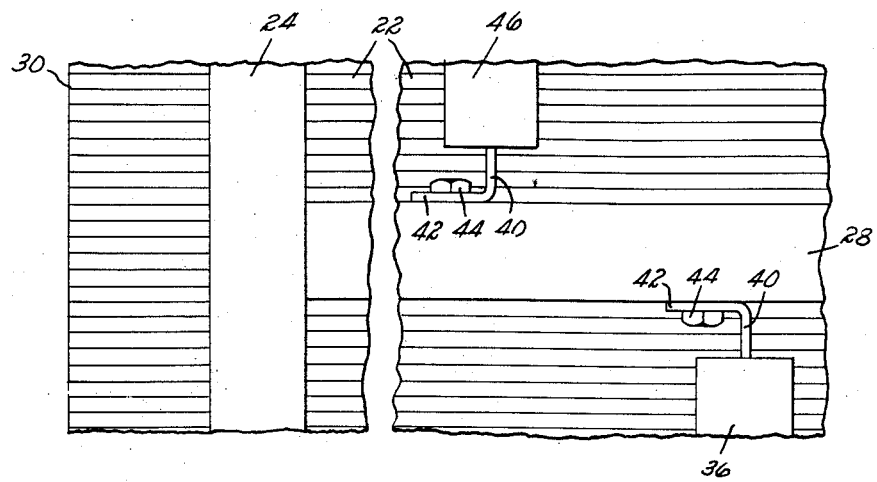
Fig. 4 is an enlarged partial and broken center elevation of the device of Fig. 1.

Rods 22 in each of the quadrants above described are divided into independently vibratory longitudinal portions by arc-like frets such as 34 and 36 as shown in Fig. 1. The frets are of the same circumferential curvature as are the end rings 24 and 26, and terminate inwardly in the same V configuration, as at 38, Fig. 3, as do the end rings to which the rods are welded. The frets are secured by angle brackets 40 fixed to each end thereof and having base plates 42 clamped by bolts 44 to the longitudinal bars 28 to position the fret transversely of its quadrant with the apex of the V-shaped inner ridge 38 firmly pressing against the rods. The apex of each fret thus divides the rods into two longitudinally disposed vibratory sections, with the rod portions in each section free to vibrate at a fundamental frequency which is determined by the longitudinal setting of the fret. The fret brackets are adapted to be clamped at any desired position along the axis of the frame structure. The fret setting in each quadrant is such as to divide the rods into unequal longitudinal portions, with a fundamental frequency established in the shorter portion which is a multiple of the fundamental frequency established in the longer portion. As also shown in Fig. 1, the fret setting in one quadrant is staggered in relation to the fret setting of an adjacent quadrant, since as explained above, the resulting harmonic frequencies must differ to result in a build-up of sound waves of opposite amplitude for cancelation. Since steel is a good sound transmitting medium, the manner in which the converted low frequency turbulence energy leaves the tailpipe extension housing needs no explanation.

Fig. 1 shows frets 34 and 36 positioned in axially staggered relation against the rods on the viewable side of the array. Frets 46 and 48, identical with frets 34 and 36, and shown dotted, are axially staggered on the opposite side of the drum but in different axial positions to produce harmonics of different frequency range for reasons stated above, the four frets thus substantially encircling the cylindrical array of rods. As shown in Fig. 2, the frets do not engage all of rods 22, since the space required for brackets 40 and longitudinal spacers 28 result in circumferential gaps between the frets, hence the plurality of rods spanning those gaps are free to vibrate at the fundamental frequency of the rod length between apexes of rings 24 and 26 to which they are welded. As is evident, additional harmonics will develop between the fundamental and the two fret determined frequencies since the latter frequencies, being selected as multiples, are thereby fixed as a multiple of the fundamental. Further, the free rod end extending axially beyond each of the mounting ring apexes vibrate, due to their short length, in a known manner as clamped free bars, and at a very high frequency, the length of the free rod ends being also selected to produce a frequency which is a multiple of the fundamental and the fret controlled frequencies divided therefrom.

As is well known in the art, the vibrations of a stretched wire or thin rods such as employed herein are controlled by the tension, while the stiffness may generally be disregarded. In the case of a relatively thick wire or rod, the stiffness is all important and the tension may be disregarded. The rod diameters herein employed are preferably within the range to respond as stretched wires or strings in which harmonic waves travel with a velocity independent of wave length and the latter is controlled by applied tension. The required tensioning for any set of rods thus serving as strings varies of course with the diameter and rod material, and must be empirically determined.

In view of the multiple exhaust gas initiated frequencies resulting from independent vibration of the various rod portions as above described, and the resulting highly complex harmonic patterns involved, no attempt will be made to explain mathematically the complex theory of operation. It has been found highly desirable to select, by proper setting of the frets, different multiple frequencies in each of the quadrants; and as above stated, increased effectiveness is obtained by multiplying the fret controlled rod sections beyond the quadrants as shown. There is no apparent limit to such multiplication short of dividing each rod into vibratory portions, one portion of which is the multiple of the other. It is believed that the efficiency of the detuner as an exhaust muffler varies as an algebraic function of the complexity of the resulting harmonic pattern, and that sound elimination, through opposed phase cancellation, is largely responsible for that end result.

As will be apparent to persons skilled in the art, various modifications and adaptations of the structure above described will become readily apparent without departure from the spirit and scope of the invention, the scope of which is defined in the appended claims.

I claim:

1. A sound attenuator for hot, high velocity exhaust gases comprising: a heat resistant housing having a central axis and provided with an inlet and an outlet for the exhaust gases at opposite ends of said housing, said inlet and outlet being axially aligned, a plurality of elongate elements, means mounting said elements under tension in said housing in a direction generally parallel to the housing axis between said inlet and outlet whereby said exhaust gases move along said elements, and means dividing some of said elements into independent vibratory sections longitudinally thereof.

2. A sound attenuator for hot, high velocity exhaust gases comprising: a heat resistant housing having a central axis and inlet and outlet passages aligned about said central axis, spaced supports fixed to the inner wall of said housing, a plurality of vibratory elements fixed to said supports to extend therebetween parallel to the housing axis and under tension, and frets engaging some of said elements non-symmetrically and dividing said engaged elements into longitudinal portions which vibrate at harmonically related frequencies.

3. A sound attenuator for hot, high velocity exhaust gases comprising: a cylindrical heat resistant housing, a plurality of axially extending elongate vibratory rods fixed at each end and maintained under tension in a cylindrical array within and concentrically spaced inwardly of said housing, and an arc-like fret mounted to engage a portion of said rods in a plane transverse to the axis of said cylinder, said fret being positioned transversely of said rods to divide the rods engaged thereby into axial portions isolated to vibrate independently, the fundamental frequency of some of the rod portions being a multiple of the fundamental frequency of other of the rod portions.

4. The sound attenuator of claim 3, including a plurality of frets engaging said rods throughout circumferentially spaced arcs about said array.

5. A sound attenuator for hot, high velocity exhaust gases comprising: a cylindrical heat resistant housing, a plurality of axially extending wire-like elements concentrically mounted under tension within said housing and radially spaced inwardly of the inner wall thereof, and a plurality of frets in contact with said elements intermediate the ends thereof dividing the elements into independent vibratory portions of unequal axial length.

6. The sound attenuator of claim 5 wherein said frets comprise rib-like elements mounted to engage different groups of said wire-like elements in planes transverse to the axis of said housing.

7. The sound attenuator of claim 5 including a plurality of frets, each engaging an individual group of wire-like elements, at least one said fret being axially offset from another fret.

8. The sound attenuator of claim 5 wherein each of said frets is axially offset from the others.

9. A sound attenuator for hot, high velocity exhaust gases comprising: a cylindrical heat resistant housing, a pair of annular supports fixed to the inner wall thereof in axially spaced relation, a plurality of elongate vibratory elements fixed to said supports to extend axially therebetween under tension inwardly of the housing inner wall, and means extending through circumferential arcs and engaging some of said elements intermediate said supports to divide the elements into longitudinal portions which vibrate at different frequencies, one of said portions having a length whose natural frequency period is a multiple of another.

10. In a sound attenuator of the character described, a cage-like framework comprising a pair of rings, a plurality of spacers fixed to extend therebetween at circumferentially spaced intervals, a plurality of wire-like rods having portions fixed to said rings with major rod portions held under tension therebetween, and a plurality of arcuate frets having ends fixed to said spacers and inner ribbed portions firmly engaging the rods in a plane transverse to the axis of said framework, one said fret being disposed between adjacent pairs of circumferentially disposed spacers.

11. The sound attenuator of claim 10 including mounting brackets fixed to each end of said frets, and means associated with said spacers and brackets for selectively positioning the frets longitudinally of said spacers.

12. The sound attenuator of claim 10 wherein said rods are of stainless steel and of a diameter to vibrate at a frequency determined by the tension thereof.

13. The sound attenuator of claim 10 wherein said rods extend between said rings substantially throughout the circumference thereof, said frets engaging said rods throughout circumferentially spaced arcs, whereby the rods between said arcs are free to vibrate at a frequency fixed by the ring spacing rather than by the frets.

14. In a device of the character described, a gas turbine housing, a tailpipe of gradually reduced diameter leading therefrom, a cylinder leading from said tailpipe, a cylindrical array of tensioned wire-like rods mounted in said cylinder with the rods spaced inwardly of the cylinder wall and concentric therewith, and means for dividing circumferentially spaced groups of said rods into independent vibratory portions, the length of one of said rod portions being such that its fundamental frequency is a multiple of the fundamental frequency of another rod portion.

References Cited in the file of this patent

UNITED STATES PATENTS

| | | |
|---|---|---|
| 890,534 | Schroder | June 9, 1908 |
| 919,252 | Schroder | Apr. 20, 1909 |
| 969,126 | White | Aug. 30, 1910 |
| 1,384,964 | Leggett | July 19, 1921 |
| 1,923,870 | Kressmann | Aug. 22, 1933 |
| 2,625,235 | Caulkins | Jan. 13, 1953 |

FOREIGN PATENTS

| | | |
|---|---|---|
| 237,674 | Great Britain | Aug. 6, 1925 |
| 1,084,419 | France | July 7, 1954 |
| 766,985 | Great Britain | Jan. 30, 1957 |